(12) United States Patent
Coughlin

(10) Patent No.: US 12,279,607 B2
(45) Date of Patent: Apr. 22, 2025

(54) HAND-HELD INSECT ELIMINATOR

(71) Applicant: Stephen James Coughlin, Mountain View, CA (US)

(72) Inventor: Stephen James Coughlin, Mountain View, CA (US)

( * ) Notice: Subject to any disclaimer, the term of this patent is extended or adjusted under 35 U.S.C. 154(b) by 0 days.

(21) Appl. No.: 18/648,442

(22) Filed: Apr. 28, 2024

(65) Prior Publication Data

US 2024/0324577 A1  Oct. 3, 2024

Related U.S. Application Data

(63) Continuation-in-part of application No. 17/676,812, filed on Feb. 21, 2022, now abandoned.

(51) Int. Cl.
*A01M 3/02* (2006.01)

(52) U.S. Cl.
CPC ..................... *A01M 3/02* (2013.01)

(58) Field of Classification Search
CPC ............ A01M 3/00; A01M 3/04; A01M 3/02; A01M 3/002
See application file for complete search history.

(56) References Cited

U.S. PATENT DOCUMENTS

| | | | | |
|---|---|---|---|---|
| 3,798,828 | A * | 3/1974 | Walti | A01M 3/02 43/137 |
| 2011/0120001 | A1 * | 5/2011 | Karl | A01N 25/34 135/96 |
| 2018/0184634 | A1 * | 7/2018 | DiMeo | A01M 1/14 |
| 2024/0074424 | A1 * | 3/2024 | Billingsley | A01M 1/14 |

* cited by examiner

*Primary Examiner* — Peter M Poon
*Assistant Examiner* — Shada Mohamed Alghailani

(57) ABSTRACT

This Hand-Held Insect Eliminator is a device comprising two flaps of optimal size and shape, which are connected at one end by a hinge. Intelligently designed integrated finger housings at the hinged end allow the device to be easily opened and snapped shut by a wide variety of hand and finger sizes. The device can be used on many types of insects, whether flying, hanging, crawling, or at rest. It can be operated in mid-air, against a wall, ceiling, or directly against a surface, or just above a surface, depending on the type and location of the insect. The device incorporates a unique containment grid which allows the elimination to be done cleanly.

1 Claim, 1 Drawing Sheet

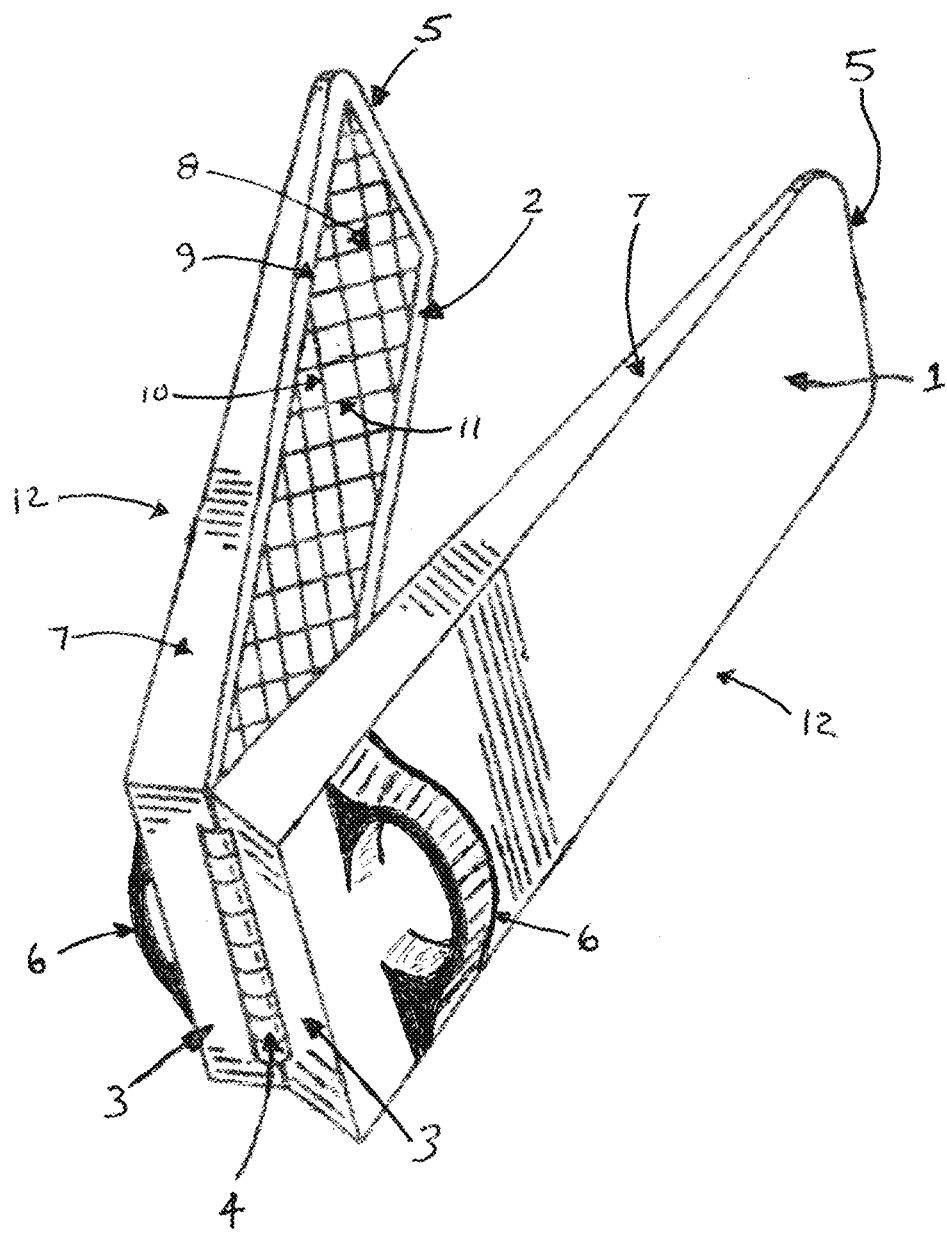

HAND-HELD INSECT ELIMINATOR

CROSS-REFERENCE TO RELATED APPLICATIONS

This application is a Continuation-in-Part of prior-filed and co-pending U.S. patent application Ser. No. 17/676,812 filed Feb. 21, 2022, which claims the benefit of priority to U.S. Provisional Patent Application Ser. No. 63/172,534, filed Apr. 8, 2021, the complete contents of each of which are hereby incorporated herein by reference.

BACKGROUND

Field of the Invention

The present disclosure relates generally to a device for eliminating insects and other pests at rest or in flight, i.e., a better fly swatter.

Background

Development of fly swatters has continued for many decades, yet problems with pest elimination persist. To address the problems, some fly swatters have joined two blades in a closing motion. While these devices may have operated satisfactorily, they have not been found to be entirely suitable, being unnecessarily complex or of limited utility. Thus, there remains a need in the art for providing a simpler and better fly swatter. Insect data cited herein was obtained from multiple sources, including researchgate.net, University of Florida (entnemdept.ufl.edu), animaldiversity.com, and physicsforum.com.

Known prior art eliminates insects through the closing of plates or flaps to capture or kill insects through crushing. The inventions disclosed in the relevant prior art have weight or mechanics that preclude the rapid deployment required to capture or kill nimble and fast-moving insects, many of which fly. Voss (U.S. Pat. No. 1,664,762) employs flaps which do not have a continuous solid surface or containment structure, being defined and shown as open rectangular frames covered by a screen-like wire mesh, which would be unlikely to contain a crushed insect's fluid or smaller parts.

SUMMARY

An object of the present invention is the provision of an insect eliminator to eliminate an insect more cleanly and effectively than a conventional fly swatter, use of the hand or newspaper, without the use of chemical sprays or electricity. Another object of the invention is the provision of an insect eliminator to be used in midair to kill flying insects and suspended spiders. A further object of the invention is to be used as tongs to pick up or crush beetles and other crawling insects on the ground or other flat level surface. A still further object of the invention is to be used directly adjacent to a wall, ceiling, or other surface, to pick up or crush the insect without staining, scratching, or otherwise damaging the surface with the remains of the crushed insect. Removal or disposal can take place in a different area suitable to the user.

The disclosed apparatus achieves the aforementioned objects by providing an insect eliminator device that is comprised of a pair of complementary lightweight solid flaps, each of which has an interior face and an exterior face. The interior face of one flap can face the interior face of the other flap. The flaps can each have a first end, a second end, and a pair of side ends. The first end of each flap can be opposite to the second end and perpendicular or substantially perpendicular to the side ends. A flap connector, such as a hinge and/or any other known convenient and/or desired mechanism, can be attached to the second end of the flaps.

In some embodiments, each of the flaps can be constructed to be grasped by the operator to facilitate operation of the insect eliminator device. In some embodiments, the thickness of the flaps can increase from thinner to thicker in the direction away from the first end of the flaps. The side ends of both flaps can be rounded at the intersection with the first ends. The flaps can comprise a containment grid which can be defined by an array of grooves on the interior face of the flaps. The flaps can be constructed from a wide variety of materials and forms, but in some embodiments can be made from rigid lightweight plastic, for low cost, low weight, and case of manufacture.

BRIEF DESCRIPTION OF THE DRAWING

The objects and advantages of this invention will be readily appreciated and understood by reference to the following detailed description when considered in connection with the accompanying drawing, which shows a top perspective view of an insect eliminator of the present invention, in which like reference numerals designate like parts throughout the drawing.

FIG. 1 depicts an embodiment of the Hand-held Insect Eliminator.

DETAILED DESCRIPTION OF THE INVENTION

As used herein, the term "insect" is meant to include both the usual class of invertebrate arthropods characterized by a segmented body consisting of a head, thorax, and abdomen, three pairs of jointed legs, usually two pair of wings, and one pair of antennae, including bees, flies, and beetles; and additionally, arachnids, the class characterized by a two-part body, four pairs of jointed legs, and no wings or antennae, including spiders, scorpions and ticks.

An embodiment of the hand-held insect eliminator is illustrated by way of example in the accompanying drawing, in which an insect eliminator device comprises a pair of complementary lightweight solid flaps 12, each of which has an interior face 2 and an exterior face 1. The interior face 2 of one flap faces the interior face 2 of the other flap. Research and testing determined the optimal length, width, and color of the flaps, said color being a red of 670-700 nm wavelength. In some embodiments, flaps can each have a first end 5 of 100 mm+/−2 mm width, a second end 3 of 100 mm+/−2 mm width, and a pair of side ends 7 of 260 mm+/−3 mm length. However, in alternate embodiments the flaps can employ any known, convenient and/or desired dimensions and/or tolerances. The first end 5 of each flap can be opposite to its second end 3 and perpendicular and/or substantially perpendicular (within 2 degrees) to its side ends 7.

A pivoting connector 4, such as a hinge and/or any other known, convenient and/or desired mechanism, can be attached to the second end 3 of each flap. The thickness of each flap from exterior face 1 to interior face 2 can increase from 10 mm+/−2 mm at the first end 5 to 20 mm+/−2 mm at the second end 3. However, in alternate embodiments, any known, convenient and/or desired taper or lack of taper and tolerances can be employed. The side ends 7 of each flap can be rounded at their intersection with the first end 5, providing the operator with a mechanism to eliminate a crawling insect by easily picking it off walls, clothing, table tops, lamp shades, and/or any surface and/or thing. The integrated ellipsoidal finger housing 6 was designed using biometric research to yield the optimum location, size, and shape to be utilized by a wide range of operator hand and finger sizes. In some embodiments, integrated ellipsoidal finger housing 6 can be merged into the exterior face 1 of each flap, arising perpendicularly and/or substantially perpendicular (within 5 degrees) from exterior face 1 not more than 15 mm from the second end 3 of each flap, with a 6 mm+/−1 mm thickness and an ellipsoidal opening of 25 mm+/−2 mm in height, 50 mm+/−2 mm in width, and 25 mm+/−2 mm in length, allowing the operator's thumb to engage one flap and at least one finger to engage the other flap. However, in alternate embodiments various known, convenient and/or desired dimensions and tolerances can be employed.

Each flap can comprise a containment grid 8 on its interior face 2, which can be defined by an array of interconnected narrow channels or depressions, herein described as grooves, in interior face 2, designed for complete containment of the remains of a crushed insect. The containment grid 8 comprises a perimeter rectangle groove 9 located 6 mm+/−1 mm from each edge of interior face 2 and an interior array of grooves in a cross-hatch pattern, said interior array comprises a first set of parallel grooves 10 not more than 13 mm apart from each other, terminating into said perimeter rectangle groove 9 at approximately 45-degree angles, and a second set of parallel grooves 11 not more than 13 mm apart from each other, intersecting said first set of parallel grooves 10 at approximately 90-degree angles and terminating into said perimeter rectangle groove 9 at approximately 45-degree angles, said grooves all being 0.8 mm in depth and 0.8 mm in width. However, in alternate embodiments various known, convenient and/or desired angles, dimensions and patterns of grooves can be employed.

Dimensions given herein have been researched, calculated, and tested to provide complete crush containment of a wide variety of insects. The common housefly (*Musca domestica*) ranges in size from 4 to 8 mm, with an average length of 6.4 mm and an average mass of 12 mg. *S. bullata*, a fly common in the northeastern U.S. can be up to 17 mm in length and 45 mg in mass. Common hornets can reach 30 mm in length with an average mass of 480 mg. Reported density of these insects is 100 kg/m$^3$.

Containing insects of this larger size requires two critical attributes of the containment grid 8: a circuitous path to the edge of the array and sufficient volume. In some embodiments, the circuitous path can be achieved by having the interior array grooves intersect the perimeter rectangle groove at 45-degree angles, adapted and configured to inhibit any fluid from moving directly along the shortest path to any edge of the device. However, in alternate embodiments various, known, convenient and/or desired patterns of grooves can be employed.

In the embodiment depicted in FIG. 1, the total volume of the grooves is a significant attribute to enable containment of the remains of an insect. Since a 480 mg hornet is likely to be at or near the maximum size normally encountered, its mass can be used with the 100 kg/m$^3$ density to calculate its volume, and thus the approximate maximum volume the device would be required to contain:

$$(0.00048 \text{ kg}) \times (1 \text{ m}^3/100 \text{ kg}) \times (1E9 \text{ mm}^3/\text{m}^3) = 4800 \text{ mm}^3$$

Using the flap and grid dimensions given above, the containment grid's total volume can be determined by summing the total length of all the grooves on one flap, then multiplying it by their width and depth, then multiplying by two, to account for the opposing flap:

$$(3744 \text{ mm} \times 0.8 \text{ mm} \times 0.8 \text{ mm}) \times 2 = 4792 \text{ mm}^3$$

The above two calculated volumes being essentially equal demonstrates that the remains of a large insect can be fully contained within the grooves. Furthermore, assuming the insect is not entirely liquid/fluid, the remains of the insect can still be fully contained between the flaps even if not crushed directly in the center of the grid. Smaller insects can be fully contained even if crushed close to the edges of the grid. The design features and dimensions delineated herein yield an insect eliminator device of utility and functionality, employing a containment method not available in prior art.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. A hand-held insect eliminator, comprising:
    a pair of complementary lightweight solid flaps, each having an interior face and an exterior face, each flap of said complementary lightweight solid flaps increasing in thickness from 10 mm+/−2 mm at a first end to 20 mm+/−2 mm at a second end;
    wherein said pair of complementary lightweight solid flaps are joined by a pivoting connector at the second end;
    wherein each flap of said pair of complementary lightweight solid flaps has an integrated ellipsoidal finger housing at the second end for grasping and operating;
    wherein each said interior face of each said complementary lightweight solid flaps comprises a containment grid defined by an array of interconnected grooves configured to contain remains of an insect of up to 4800 mm$^3$ volume;
    wherein said complementary lightweight solid flaps have dimensions of 100 mm+/−2 mm width and 260 mm+/−3 mm length;
    wherein said containment grid comprises a perimeter rectangle groove 6 mm+/−1 mm from each edge of each said interior face of each of said complementary lightweight solid flaps and an interior array of grooves in a cross-hatch pattern;
    wherein said interior array of grooves comprises:
        a first set of parallel grooves not more than 13 mm apart from each other, terminating at said perimeter rectangle groove at approximately 45-degree angles; and
        a second set of parallel grooves not more than 13 mm apart from each other, intersecting the first set of parallel grooves at approximately 90-degree angles and terminating into said perimeter rectangle groove at approximately 45-degree angles; and wherein said first set of parallel grooves and said second set of parallel grooves and said perimeter rectangle groove each have dimensions of 0.8 mm depth and 0.8 mm width.

\* \* \* \* \*